United States Patent
Gulati et al.

(10) Patent No.: US 6,965,641 B1
(45) Date of Patent: Nov. 15, 2005

(54) APPARATUS AND METHOD FOR SCALABLE BUFFERING IN A DIGITAL VIDEO DECODER

(75) Inventors: Amit Gulati, Santa Clara, CA (US); Subramania I. Sudharsanan, Union City, CA (US); Parthasarathy Sriram, San Jose, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/517,804

(22) Filed: Mar. 2, 2000

(51) Int. Cl.[7] ............................................. H04N 7/12
(52) U.S. Cl. ............. 375/240.01; 375/240; 375/240.12; 375/240.25; 375/240.26
(58) Field of Search ...................... 375/240, 240.12, 375/240.15, 240.01, 240.25, 240.26; 348/445; 711/120, 165, 3, 136, 173; 725/93

(56) References Cited

U.S. PATENT DOCUMENTS

| | | | |
|---|---|---|---|
| 5,276,851 A * | 1/1994 | Thacker et al. | 711/120 |
| 5,440,336 A * | 8/1995 | Buhro et al. | 725/93 |
| 5,594,886 A * | 1/1997 | Smith et al. | 711/136 |
| 5,630,097 A * | 5/1997 | Orbits et al. | 711/165 |
| 5,634,027 A * | 5/1997 | Saito | 711/3 |
| 5,668,599 A * | 9/1997 | Cheney et al. | 375/240.15 |
| 5,802,600 A * | 9/1998 | Smith et al. | 711/173 |
| 6,115,072 A * | 9/2000 | Vuong et al. | 348/445 |

* cited by examiner

*Primary Examiner*—Allen Wong
(74) *Attorney, Agent, or Firm*—Hamilton & Terrile, LLP; Stephen A. Terrile

(57) ABSTRACT

A method of assigning a buffer size in a video decoder includes the step of establishing a first buffer size for a scalable buffer. A video data stream is then processed with the scalable buffer configured to the first buffer size. A second buffer size is then selected for the scalable buffer. The video stream is then processed with the scalable buffer configured to the second buffer size. Memory utilization data characterizing memory performance during processing with the scalable buffer at the first buffer size and the second buffer size is then created. Afterwards, a buffer size is assigned for the scalable buffer in accordance with the memory utilization data.

18 Claims, 5 Drawing Sheets

APPARATUS AND METHOD FOR SCALABLE BUFFERING IN A DIGITAL VIDEO DECODER

BRIEF DESCRIPTION OF THE INVENTION

The present invention relates generally to digital video signal processing. More particularly, this invention relates to a technique for scalable buffering in a digital video decoder.

BACKGROUND OF THE INVENTION

Digital image video devices (e.g., high definition television, digital video recorders, cameras, and conference systems) have data rate or bandwidth limitations. A digital image video recording creates an enormous amount of digital data. To accommodate digital image video device bandwidth limitations, and deliver digital data at increased transmission speeds, digital image data is compressed, or encoded, before being transmitted or stored. A compressed digital video image is decompressed, or decoded, prior to its display. Examples of widely used compression techniques ("standards-based") are those that comply with the Moving Pictures Experts Group ("MPEG") and Joint Pictures Experts Group ("JPEG") standards.

Decoding encoded image data is computationally intensive and is associated with a heavily pipelined data-path where vast amounts of data move through a processor. The decoding process may be performed with a dedicated hardware decoder or it may be performed on a general purpose computer. The present invention is applicable to both types of decoders. However, by way of example, the present invention is disclosed in the context of a decoder implemented on a general purpose computer.

A number of advanced processor instruction sets (e.g., Sun SPARC VIS, sold by Sun Microsystems, Inc., Palo Alto, Calif.) have been introduced for use in general purpose computers. These advanced processor instruction sets optimize the computational aspects of standards-based video decoding. However, there is still a need for a standards-based video decoder design that optimizes the heavily pipelined data-path aspects of the video decoder's underlying memory system. CPU performance is directly related to the time the CPU spends in executing a program and the time that the CPU waits for the memory system. By reducing memory system access times, CPU performance can be enhanced.

An optimized decoder design involves several challenges. The design must consider effects that its implementation can have on performance aspects of the decoder's underlying memory system. For example, to facilitate rapid access to data and instructions, a general purpose CPU typically uses a Data Cache ("D-cache") and a separate Instruction Cache ("I-cache"). Cache use is optimized when required data and instructions are located in a respective cache. CPU stall-cycles come primarily from cache misses (a cache miss occurs when the necessary data or instructions are not in a cache). To optimize cache use and increase overall processor performance, a video decoder should design its data-path both in a way that cache misses are minimized and caches are not underutilized.

Most existing cache use optimization schemes are optimized for a particular platform. Thus, a single cache use optimization scheme is not readily ported to different computer architectures.

Designers often need to make difficult cache use design tradeoffs to design a video decoder that is portable across several architectures. These tradeoffs involve balancing cache use factors that cannot all be maximized at the same time. The results of implementing these design tradeoffs are unpredictable and often lead to costly software rewrites to accommodate some new knowledge about the costs and benefits of the design tradeoffs.

In view of the foregoing, it would be highly desirable to provide an improved video decoder with scalable buffers that can be dynamically re-sized to optimally process a video input stream.

SUMMARY OF THE INVENTION

A method of assigning a buffer size in a video decoder includes the step of establishing a first buffer size for a scalable buffer. A video data stream is then processed with the scalable buffer configured to the first buffer size. A second buffer size is then selected for the scalable buffer. The video stream is then processed with the scalable buffer configured to the second buffer size. Memory utilization data characterizing memory performance during processing with the scalable buffer at the first buffer size and the second buffer size is then created. Afterwards, a buffer size is assigned for the scalable buffer based upon the memory utilization data.

The apparatus of the invention is a computer readable memory to direct a computer to function in a specified manner. The apparatus includes a buffer management module to establish a first buffer size and a second buffer size for a scalable buffer. A video decoding module processes a video stream utilizing the first buffer size and the second buffer size. An analysis module creates memory utilization data characterizing memory performance during processing with the first buffer size and the second buffer size. The video decoding module is then used to assign a buffer size for the scalable buffer in accordance with the memory utilization data.

The techniques of the invention are applicable to decoders formed in hardware or software. That is, the techniques of the invention can be used in connection with micro-coded hardware decoders or software running on a general purpose computer. In either context, the performance of the decoder is analyzed for different buffer sizes. The buffer size that produces the optimal results is subsequently utilized to process the data stream. The assigned buffer size may be used statically or may be changed dynamically. In a dynamic implementation of the invention, if the rate of flow of data and/or instructions in the data stream shifts, the buffer size is altered to accommodate the new data stream.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

By way of example, the invention is described in connection with a software embodiment of a digital video decoder. Those skilled in the art will appreciate that the concepts of the invention are equally applicable to a hardware embodiment of a digital video decoder.

Figure 1:
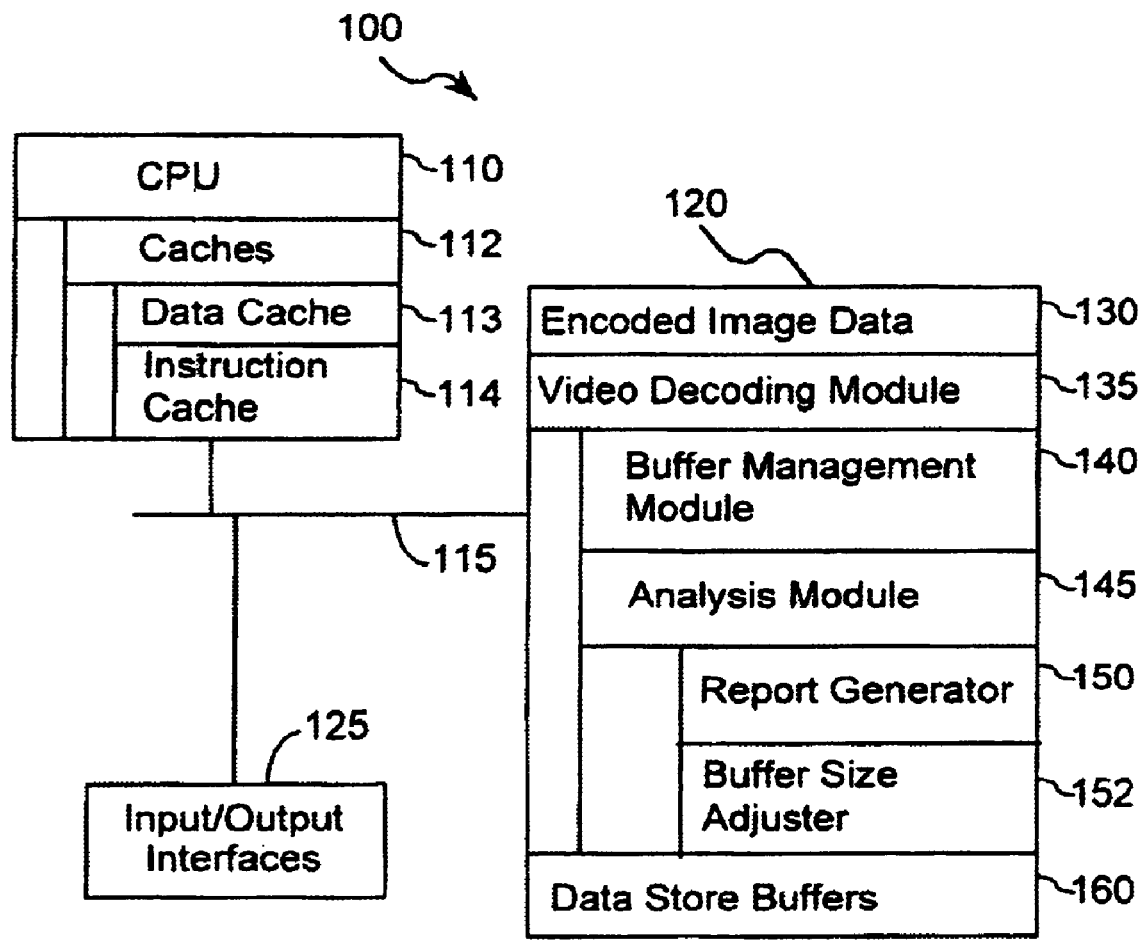
FIG. 1 is a block diagram of a programmed digital image video decoder with scalable buffering according to an embodiment of the present invention.

FIG. 1 illustrates a software-based digital video decoder 100 implemented in a general purpose computer. In an embodiment of the invention, the video decoder 100 includes one or more data processing units ("CPUs") 110. Each CPU 110 is connected to a memory 120, which will typically include both high speed random access memory as well as non-volatile memory (e.g., a magnetic disk drive). The system 100 also includes input and output devices 125 (e.g., a keyboard, mouse, computer monitor, printer, and the like). A communication bus 115 interconnects the CPU 110, memory 120, and input/output devices 125.

The CPU 110 also contains memory in the form of one or more caches 112. The caches 112 may include a data cache 113 for storing data and an instruction cache 114 for storing instructions.

The memory 120 stores encoded image data 130 to be decoded and a video decoding module 135 for decoding the encoded image data 130 using a standards-based video decoding pipeline. The video decoding module 135 contains a buffer management module 140 for providing scalable buffering capabilities, and an analysis module 145 for analyzing data cache 113 and instruction cache 114 performance (cache miss rates) during a decoding process. The buffer management module 140 allows the video decoder 100 to scale the code size, data size and internal source and destination buffers, such that underlying data cache and instruction cache capabilities can be optimized, as discussed below.

The analysis module 145 accumulates a set of cache performance results (cache miss rates) in relation to programmed data buffer sizes. The analysis module 145 contains a report generator module 150 for reporting at least a subset of the cache performance results. The analysis module 145 also includes a buffer size adjuster 152. The buffer size adjuster 152 automatically adjusts the size of data store buffers 160 based upon the cache performance results. The buffer size adjuster 152 may be used to set a static buffer size or to accomplish dynamic buffer size adjustments, as discussed below.

FIG. 1 also illustrates data store buffers 160. The data store buffers 160 are video data buffers implemented as either software array structures or regions of dedicated Static Random Access Memory (SRAM) that store video data between processing stages. The term buffer is sometimes used in connection with caches and other physical memories. As used herein, the term buffer refers to a data structure or physical memory to store video data between processing stages of a video decoder. Thus, in a software video decoder, the buffer may be a software array structure or a region of dedicated SRAM. In a hardware video decoder, the buffer will be a physical memory region between processing stages.

The data store buffers 160 are scalable buffers utilized by the video decoding module 135. As discussed below, the size of the data store buffers 160 is adjusted and cache performance is analyzed for different data store buffer sizes. Based upon this analysis, an optimal buffer size is subsequently selected and utilized, as discussed below.

While FIG. 1 illustrates a software based module, video decoding module, the disclosed processing techniques are equally applicable to a dedicated hardware architecture. A dedicated hardware decoder may be implemented with a micro-coded engine with its own memory hierarchy, as well as intermediate buffers between stages. In such an embodiment, the hardware decoder includes a hardwired buffer management module 140, analysis module 145, and data store buffers 160. In the case of hardware decoder, the performance of the overall decoder is analyzed for different buffer sizes. The overall decoder performance is largely based upon memory performance within the decoder. Based upon this performance information, buffer resources are assigned, as discussed below.

Figure 2:
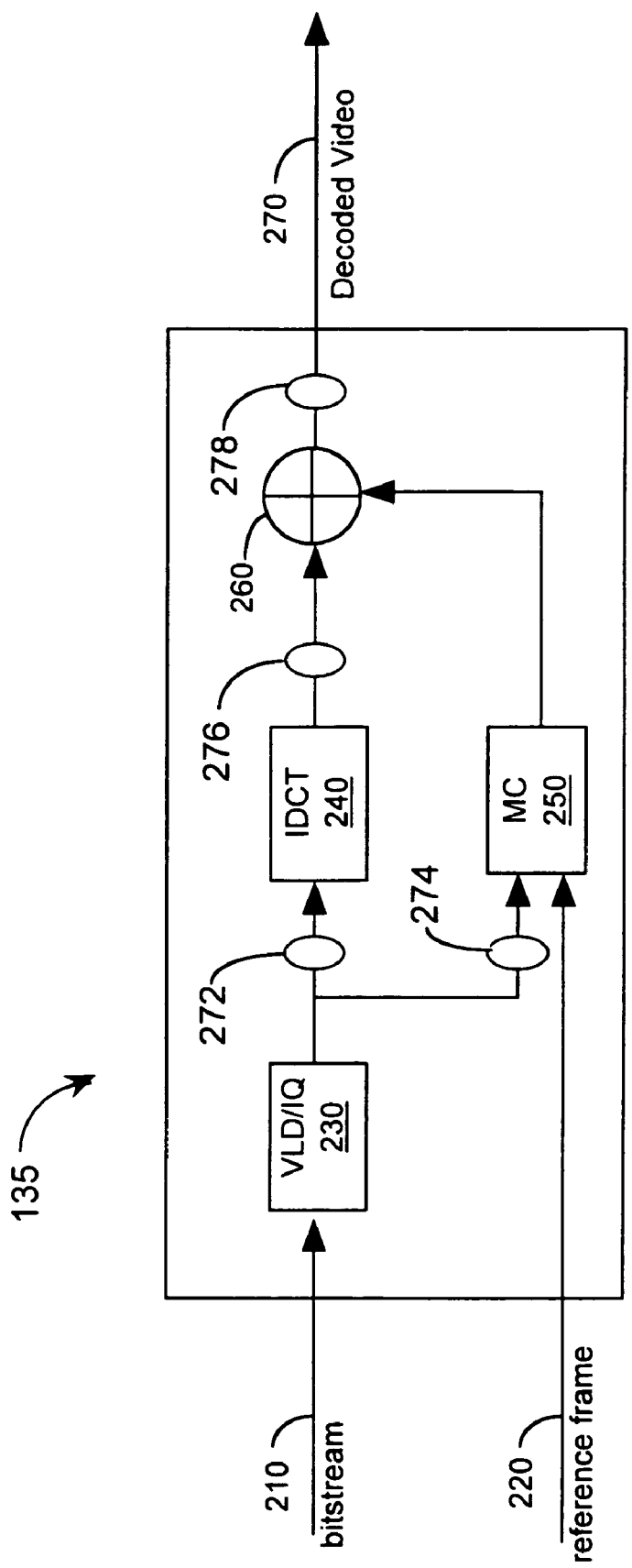
FIG. 2 is a block diagram of a video decoder implementation that may be utilized in accordance with an embodiment of the invention.

FIG. 2 illustrates a video decoding module 135, which may be implemented in software or hardware. An encoded image data bitstream is received at an input node 210 and is presented to a Variable Length Decoder/Inverse Quantization Unit ("VLD/IQ") 230 for decoding of motion vectors and Discrete Cosine Transform ("DCT") coefficients, resulting in fixed-length data. The fixed-length data is presented to an Inverse Discrete Cosine Transform Unit ("IDCT") 240, which determines Displaced Frame Difference ("DFD") information (a decoded prediction error signal). The fixed-length data is also applied to a Motion Compensator ("MC") 250. The Motion Compensator 250 uses a reference frame signal on line 220 and a motion vector decoded by the VLD/IQ 230 to generate a motion compensated prediction signal. The motion compensated prediction signal is combined with the displaced frame difference information from the IDCT 240 at mixer 260 to produce the final product, a decoded video signal on line 270.

The operation of the VLD/IQ 230, IDCT 240, MC 250, and mixer 260 are well known in the art. The invention is not directed to the independent operation of these components. Rather, the invention is directed toward the utilization of scalable buffers within a video decoder to optimize the performance of the physical memories (e.g., caches) of the video decoder. This facilitates improved decoder performance. For example, in the case of a decoder operating on a general purpose computer, the performance of the data cache and instruction cache of the CPU are enhanced.

FIG. 2 illustrates buffers 272, 274, 276, and 278 positioned between processing stages of the decoder 135. Each data store buffer isolates a functional unit's source and/or destination data bit stream from another functional unit in the decoding pipeline. For example, buffer 272 isolates the output of VLD/IQ 230 and the input to IDCT 240. As long as a source buffer never overflows, and a destination buffer never underflows, each functional unit (e.g., 230, 240, and 250) can be implemented efficiently.

Figure 3:
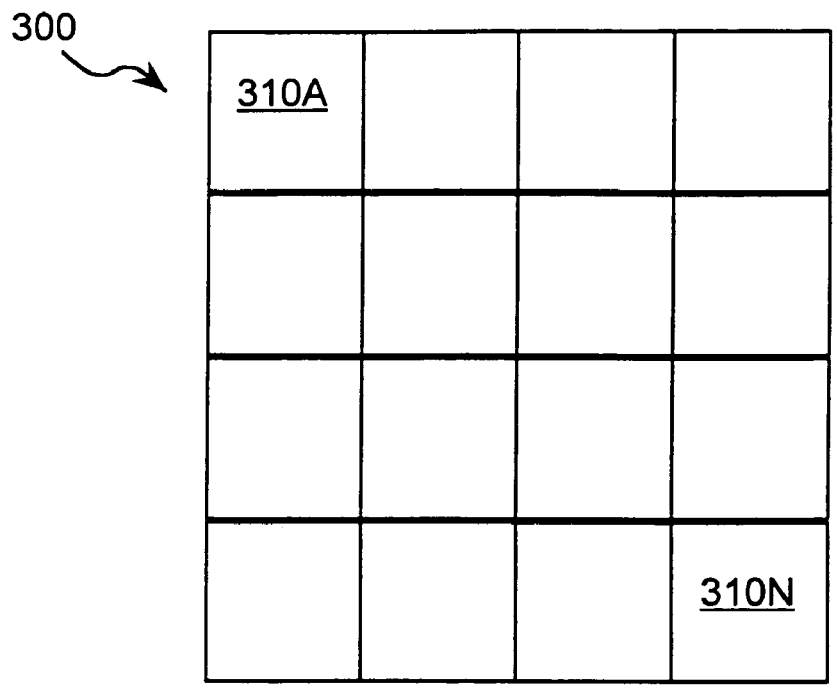
FIG. 3 is an illustration of a frame of encoded digital image data divided into a set of macroblocks.

FIG. 3 illustrates a compressed digital video image frame 300 divided into a set of macroblocks 310A–310N. Each macroblock 310 in the digital image frame 300 contains a 16×16 matrix of encoded image data pixels. A macroblock is a standard processing segment in standards-based video decoders. Most prior art video decoders process a single macroblock at a time. In the case of a decoder operating on a general purpose computer, decoding only one macroblock of image data at a time causes the instruction cache 113 of the CPU 110 to be over-utilized, while the data cache 113 of the CPU 110 is under-utilized. The data cache 113 is under-utilized because it is storing only one macroblock of a data. The instruction cache is over-utilized because it must invoke all instructions for processing of the macroblock through all of the functional units (e.g., 230, 240, 250, and 260) of the decoder. In this case, overall video decoder performance could have been improved by making better use of the data cache.

Figure 4A:
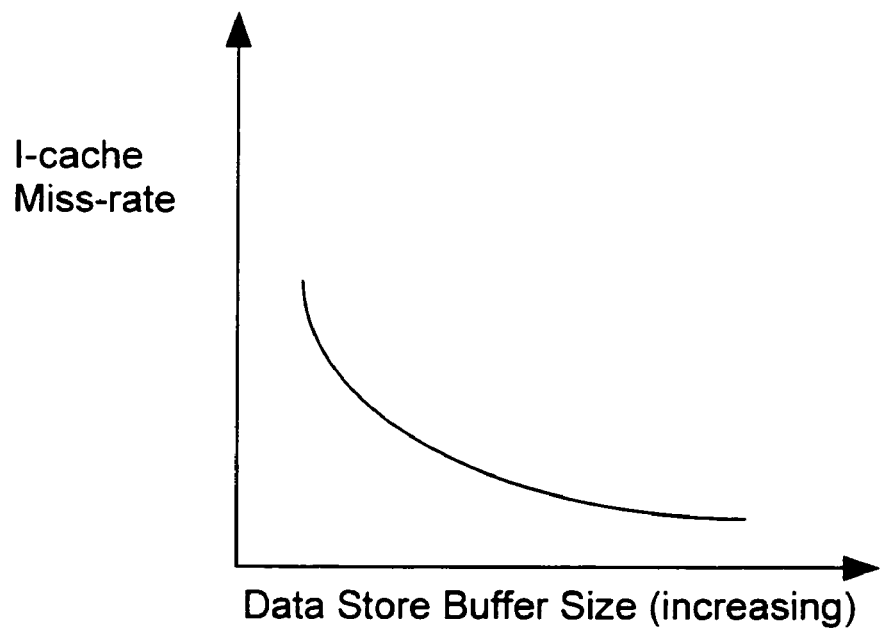
FIG. 4A is a graph illustrating instruction cache miss rates corresponding to different data store buffer sizes.

FIG. 4a illustrates the relationship between instruction cache miss rates and data store buffer sizes. The instruction cache miss rate is highest when a corresponding data store buffer size is small. The instruction cache miss rate decreases as data store buffers increase in size.

Figure 4B:
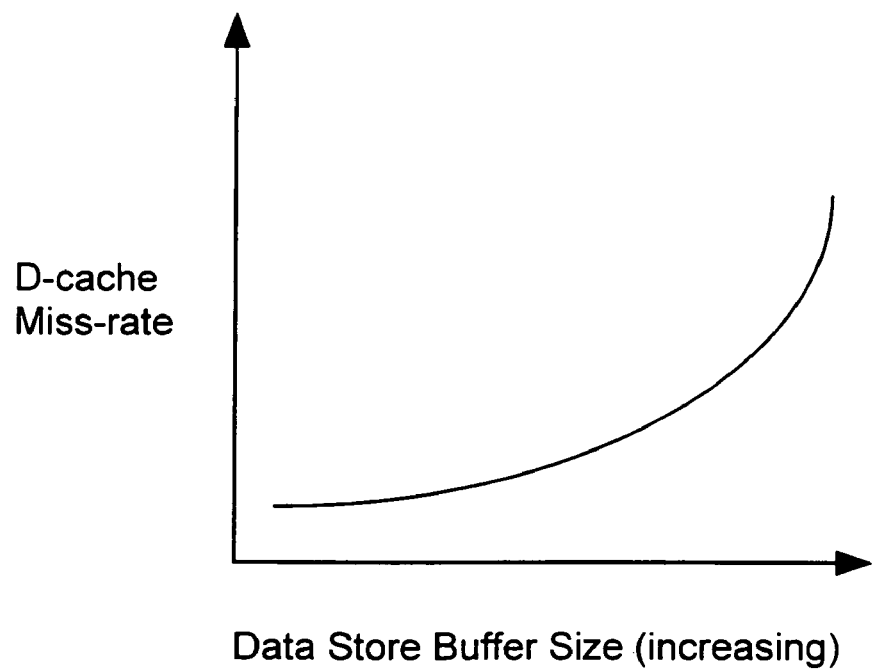
FIG. 4B is a graph illustrating data cache miss rates corresponding to different data store buffer sizes.

FIG. 4b illustrates the relationship between data cache miss rates and data store buffer sizes. In contrast to the relationship shown in FIG. 4a, data cache miss rates are lowest when the corresponding data store buffer sizes are small. Data cache miss rates increase as data store buffers increase in size.

Figure 4C:
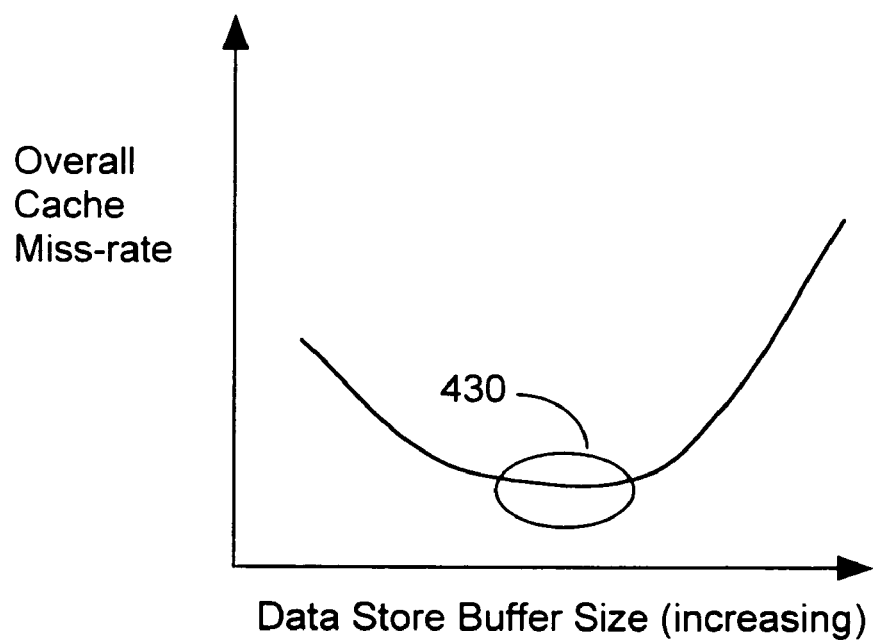
FIG. 4C is a graph illustrating overall cache miss rates corresponding to different data store buffer sizes.

FIG. 4c illustrates the relationship between overall cache-miss rates (data cache and instruction cache miss rates combined) and data store buffer sizes. A data store buffer size closest to the bottom 430 of the curve is optimal. The software decoder implementation of the invention selects a buffer size in accordance with a low overall cache miss-rate. Reliance upon this technique leads to performance improvements of several orders of magnitude for varying decoder architectures.

Designing a software video decoder application with scalable buffers involves several challenges. A software application, once built, typically has a fixed instruction code and data size, forming a "footprint." The application's code and data structures cannot be changed unless the application is rewritten and recompiled. To take full advantage of the optimal data store buffer size optimizations disclosed above, an optimized decoder application would not only allow for dynamically scalable data store buffer resolutions (without needing to rewrite and recompile the application), it would be written to take full advantage of the scalability of the data store buffers by providing for dynamic scalability across its instruction set and data size. The invention achieves these goals through utilization of performance feedback to dynamically scale buffer size, as discussed below.

Designing a video decoder application with dynamic scalability across its instruction set and data size is necessary to take full advantage of dynamically scalable data store buffers. For instance, as a data store buffer changes in size, the amounts of data being put into and taken out of the buffer by one or more decoding procedures should be adjusted accordingly. The data store buffer I/O should be balanced so as not to underflow the buffer and not to overflow the buffer. The concept of "loop unrolling" can be used to demonstrate how buffer size influences the way data is processed.

Loop unrolling mixes operations from different loop iterations in each iteration of a software loop. In other words, a code loop's "stride" (or "step") is increased and instructions in the body of the loop are replicated. Table 1 illustrates the concept of loop unrolling.

TABLE 1

An Example of Loop Unrolling

| Original Loop | Unrolled Loop |
| --- | --- |
| do i = 1,99,1<br>a(i) = a(i) + b(i)<br>enddo | do i = 1,99,3<br>a(i) = a(i) + b(i)<br>a(i + 1) = a(i + 1) + b(i + 1)<br>a(i + 2) = a(i + 2) + b(i + 2)<br>enddo |

Table 1 shows a program with two "loops" where each "do loop statement" is written "do [variable]=[start],[stop],[stride]." Although the end result of each "loop" is the same, the body of the unrolled loop is executed only one-third as many times as the original loop. The selection of a data buffer size influences the amount of loop unrolling that is performed. Therefore, the selection of a data buffer size influences the footprint of the corresponding code and thus the instruction memory.

The process of changing the video decoder application's data size and code size can have competing effects on the data cache and the instruction cache. Since loop unrolling increases the code size, more data must be stored in the data cache for the unrolled code to process. At some point, the benefits of unrolling decrease, and the burden of maintaining a large amount of data in the data cache across the unrolled portion of code may cause the data cache to overflow.

To balance the competing effects of loop unrolling, the present invention contemplates a video decoder design where (a) the amount of unrolling done across separable portions of the software decoding pipeline is dynamically scalable by a factor of "N"; (b) the dynamically scalable data store buffers are also scaled by a factor of "N"; and (c) "N" is a multiple number of macroblocks. For example, in a dynamic software implementation, a particular loop is implemented with N different unrolling factors. A single version of the loop is selected based upon the performance of the different unrolled procedures.

Table 2 illustrates an example of a method of determining optimal buffer sizes for use in a decoder. The code is executed at least twice, but typically more than two times with different values of N to create performance data. Based upon the performance data, an optimal buffer size is selected. The code is disclosed as psuedo-code. The pseudo-code used in Table 2 is a computer language that uses universal computer language conventions. While the pseudo-code employed here has been invented solely for the purposes of this description, it is designed to be easily understandable by any computer programmer skilled in the art.

TABLE 2

An Example of a Video Decoding Module

```
// Cache Management Procedure
read bitstream data      // encoded image data
let N = 4                // programmable number of macroblocks
set each Data Store Buffer Size = 2*N   // data store buffer size is some
                                         // function of "N"
let MAX_MB = 16          // maximum number of macroblocks in
                         // encoded image data
let MB = 0               // macroblock initialization
do while (MB < MAX_MB){
  let i = MB
  for N number of macroblocks{
    VLD_IQ(i)            // Variable Length Decoder ("VLD")
```

TABLE 2-continued

An Example of a Video Decoding Module

```
                    // decodes N
    i = i + 1       // macroblocks worth of bitstream data
}
let i = MB
for N number of macroblocks{
    IDCT(i)         // Inverse Discrete Cosine Transform
                    // ("IDCT")
    i = i + 1       // transforms N macroblocks of
                    // coefficients into
}                   // DFD information
let i = MB
for N number of macroblocks{
    MC(i)           // Motion Compensation ("MC") Unit
    I = i + 1       // reconstructs N macroblocks of DFD
}                   // information
let MB = MB + N
}
// Analysis Procedure
Create a set of Performance Results based on
    Cache Miss rates in relation to the selected Data Store Buffer Size
// Report Procedure
Report at least a subset of the Performance Results
```

The operation of the exemplary implementation of a Video Decoding Module shown in Table 2 is written such that each of the key computational software components of the decoding pipeline work over a varying number of macroblocks. The exemplary implementation is explained in the context of a standards-based software decoding pipeline as shown in FIG. 2.

The exemplary implementation begins by reading the bitstream data. The bitstream data is encoded digital image data and can be accessed by the video decoding module in a variety of ways, such as reading the data from memory, or receiving the data in real-time from transmission media (e.g., satellite, over-the-air, and CATV). Next, the macroblock resolution, "N," is set to equal to some number of macroblocks. The value of "N" can be set in a number of ways, e.g., at compile time, read from a data file, or even determined dynamically by applying an objective criterion to the selection process. Recall that prior art systems usually process a single macroblock of information at a time. In accordance with the invention, processing is based upon a multiple of macroblocks.

Next, the data store buffers are scaled an appropriate size as a function of "N." The $VLD_{13}$ IQ process operates until N macroblocks of bitstream data are decoded into its corresponding output data store buffer. Then the IDCT process transforms "N" macroblocks of coefficients into Displaced Frame Difference information. Finally, the MC process reconstructs N macroblocks in an efficient software pipeline across N macroblocks.

The exemplary implementation of the video decoding module shown in Table 2 is not meant to be limiting. This implementation is shown solely for purposes of explanation. Using teachings provided in this disclosure, a person skilled in the art of computer programming could implement the present invention to optimize underlying cache utilization in a number of ways.

The notion of having a video decoder design with a scalable buffer resolution allows for powerful optimizations to be made dynamically. A designer can accumulate results for cache miss rates corresponding to various data store buffer size resolutions and pick the most optimal buffer resolution in its cache behavior. To illustrate this approach, refer to FIG. 5, which illustrates a process 500 for determining a video decoder buffer size for optimal performance.

To begin the process of determining a buffer size for optimal performance, encoded image data 510 is presented to the video decoding module 135. As noted above, the encoded image data 510 can be accessed by the video decoding module 135 in a number of ways. Next, a number "N," representing a data store buffer size is selected 520. There are a number of ways that the value of "N" can be chosen, e.g., at compile time or by being read from a data file. The number "N" represents a multiple of a basic macroblock encoded image data block. Then, at least a subset of the encoded image data 510 is decoded 530 using a standards-based software decoding pipeline. Data cache and instruction cache miss rates are determined 540 and stored 550. If the cache miss rates are not optimal 560 for the underlying memory system configuration, then the process starts over again at step 520. By way of example, the optimal cache miss rate may be set at some predetermined value (e.g., below 1%). Alternately, step 560 may be implemented to measure a predetermined of iterations.

If the condition tested at step 560 is not satisfied, processing returns to step 520. It the condition tested at step 560 is satisfied, the data store buffers are then set (step 570). As previously indicated, the buffer size adjuster module 152 may be used to set the data store buffer size. This data store buffer size may be fixed (static) during subsequent processing. Alternately, the data store buffer size may be dynamically changed by intermittently or continuously processing the encoded image data in accordance with the processing steps of FIG. 5.

Figure 5:
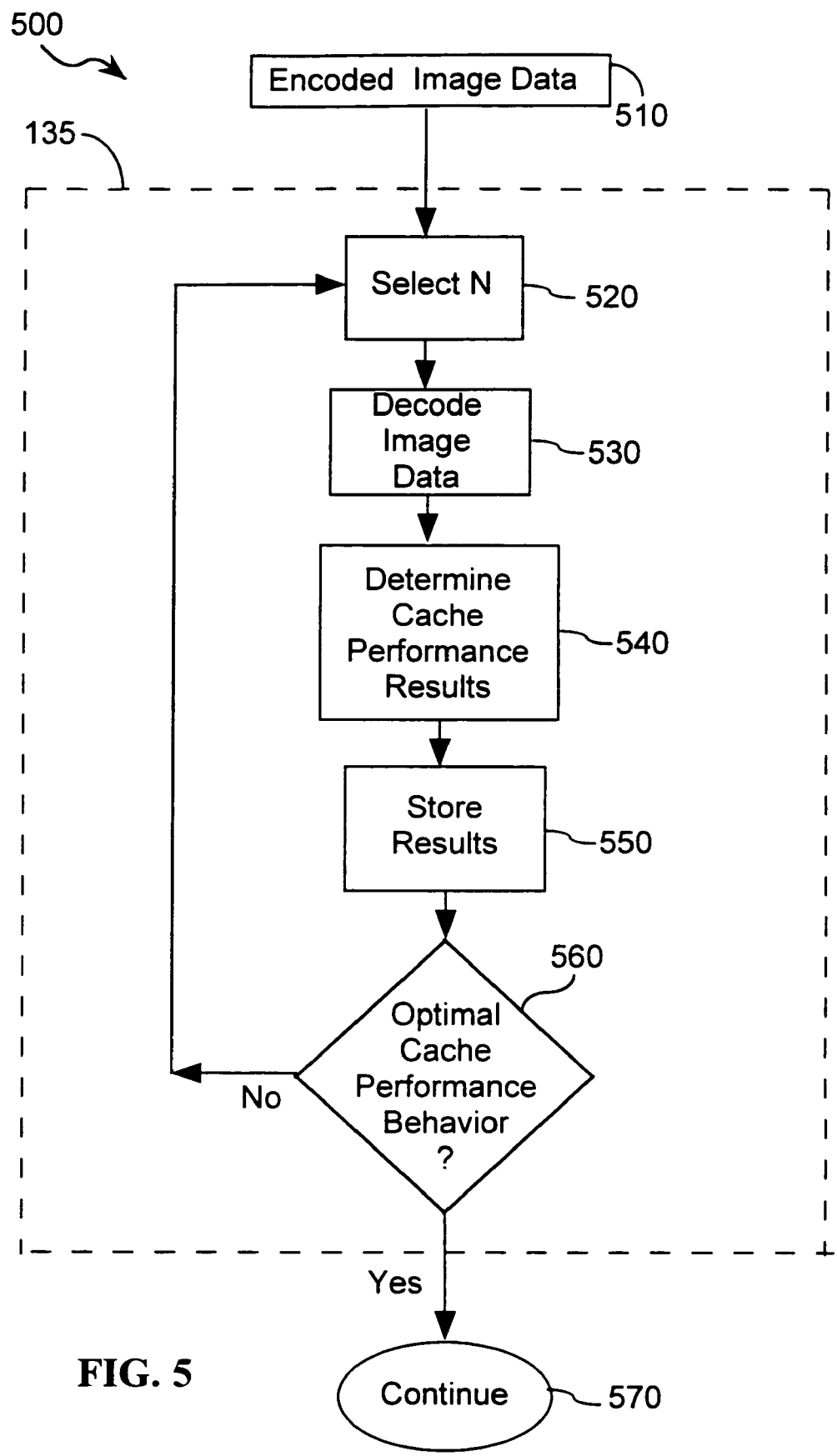
FIG. 5 is a flow diagram illustrating a process for determining a buffer size for optimal memory performance in accordance with an embodiment of the invention.

Those skilled in the art will appreciate that the processing steps of FIG. 5 can be modified for a hardware decoder. In such a case, the step of determining cache performance results (step 540) would be substituted with the step of determining memory performance results, while the step of determining optimal cache performance behavior (step 560) would be substituted with the step of determining optimal memory performance behavior.

Observe that the value "N" can also represent the amount that the code and data should be "unrolled" in the video decoding pipeline. The implementation of the video decoder with scalable buffering, as disclosed above, can alternatively be used by a video decoder architecture designer to determine optimal hardware buffer sizes.

The present invention can be implemented as a computer program product that includes a computer program mechanism embedded in a computer readable storage medium. For instance, the computer program product could contain the program modules shown in FIG. 5. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method of assigning a buffer size in a video decoder, comprising:
   establishing a first buffer size for a scalable buffer;
   processing a video data stream with said scalable buffer configured to said first buffer size;
   selecting a second buffer size for said scalable buffer;
   processing said video data stream with said scalable buffer configured to said second buffer size;
   creating memory utilization data characterizing cache memory performance during the processing with said scalable buffer configured to said first buffer size and the processing with said scalable buffer configured to said second buffer size; and
   assigning a buffer size that is dependent upon said first buffer size and said second buffer size for said scalable buffer in accordance with said memory utilization data;
   wherein the memory utilization data includes cache miss rate data and the cache memory is distinct from the scalable buffer.

2. The method of claim 1 wherein said establishing and said selecting each include defining a buffer size as a multiple of a buffer size for storing a single macroblock.

3. The method of claim 1 wherein said processing includes utilizing said scalable buffer with a variable length decoder.

4. The method of claim 1 wherein said processing includes utilizing said scalable buffer with an inverse discrete cosine transfer function module.

5. The method of claim 1 wherein said processing includes utilizing said scalable buffer with a motion compensator.

6. The method of claim 1 wherein said creating includes creating cache utilization data defining data cache miss rates.

7. The method of claim 1 wherein said creating includes creating cache utilization data defining instruction cache miss rates.

8. The method of claim 1 further comprising modifying the size of video data stream processing instructions to correspond to said buffer size selected in said assigning step.

9. The method of claim 8 wherein said modifying includes loop unrolling video data stream processing instructions to correspond to said buffer size selected in said assigning step.

10. A computer readable memory to direct a computer to function in a specified manner, comprising:
    a buffer management module to establish a first buffer size and a second buffer size for a scalable buffer;
    a video decoding module to process a video stream with said scalable buffer configured to said first buffer size and then said second buffer size; and
    an analysis module to create memory utilization data characterizing cache memory performance during the processing with said scalable buffer configured to said first buffer size and during the processing with said scalable buffer configured to said second buffer size, said analysis module including a buffer size adjuster to assign a buffer size that is dependent upon said first buffer size and said second buffer size for said scalable buffer in accordance with said memory utilization data;
    wherein the memory utilization data includes cache miss rate data and the cache memory is distinct from the scalable buffer.

11. The computer readable memory of claim 10 wherein said buffer management module establishes said first buffer size as a first multiple of a buffer size for storing a single macroblock and said second buffer size as a second multiple of a buffer size for storing a single macroblock.

12. The computer readable memory of claim 10 wherein said video decoding module utilizes said scalable buffer with a variable length decoder.

13. The computer readable memory of claim 10 wherein said video decoding module utilizes said scalable buffer with an inverse discrete cosine transfer function module.

14. The computer readable memory of claim 10 wherein said video decoding module utilizes said scalable buffer with a motion compensator.

15. The computer readable memory of claim 10 wherein said analysis module creates cache utilization data defining data cache miss rates.

16. The computer readable memory of claim 10 wherein said analysis module creates cache utilization data defining instruction cache miss rates.

17. The computer readable memory of claim 10 wherein said analysis module further includes a subsystem to modify the size of video data stream processing instructions to correspond to said buffer size assigned by the buffer size adjuster.

18. The computer readable memory of claim 17 wherein said subsystem performs loop unrolling of video data stream processing instructions to correspond to said buffer size assigned by the buffer size adjuster.

* * * * *